(12) United States Patent
Shani et al.

(10) Patent No.: US 11,849,468 B2
(45) Date of Patent: Dec. 19, 2023

(54) MANY-TO-MANY WIRELESS NETWORK RANGING TECHNIQUE

(71) Applicant: Apple Inc., Cupertino, CA (US)

(72) Inventors: Oren Shani, Saratoga, CA (US); Josef Peery, Kadima (IL); Leonid Vainbrand, Rishon LeTsiyon (IL); Udi Atar, Tel Aviv (IL); Yoav Feinmesser, Tel Aviv (IL); Yoel Boger, Shoham (IL)

(73) Assignee: Apple Inc., Cupertino, CA (US)

( * ) Notice: Subject to any disclaimer, the term of this patent is extended or adjusted under 35 U.S.C. 154(b) by 153 days.

(21) Appl. No.: 17/484,567

(22) Filed: Sep. 24, 2021

(65) Prior Publication Data
US 2022/0104177 A1    Mar. 31, 2022

Related U.S. Application Data

(60) Provisional application No. 63/083,739, filed on Sep. 25, 2020.

(51) Int. Cl.
| H04W 72/30 | (2023.01) |
| H04B 17/27 | (2015.01) |
| H04W 64/00 | (2009.01) |
| H04L 5/00  | (2006.01) |

(52) U.S. Cl.
CPC ............ *H04W 72/30* (2023.01); *H04B 17/27* (2015.01); *H04L 5/005* (2013.01); *H04W 64/006* (2013.01)

(58) Field of Classification Search
CPC .... H04W 72/30; H04W 64/006; H04B 17/27; H04L 5/005; G01S 13/765
See application file for complete search history.

(56) References Cited

U.S. PATENT DOCUMENTS

| 2003/0232620 | A1* | 12/2003 | Runkle ................. G01S 13/765 455/423 |
| 2008/0151771 | A1* | 6/2008 | Dowse ................ H04L 43/0858 370/252 |
| 2010/0157810 | A1* | 6/2010 | Oh ......................... G01S 13/767 370/241 |
| 2010/0172339 | A1* | 7/2010 | Duan .................... G01S 13/765 370/350 |
| 2014/0043977 | A1* | 2/2014 | Wiley ................... H04L 47/805 370/235 |
| 2015/0097983 | A1* | 4/2015 | Kim ..................... H04N 23/663 348/222.1 |
| 2016/0274229 | A1* | 9/2016 | Oh ......................... G01S 19/24 |
| 2016/0277890 | A1* | 9/2016 | Nallampatti Ekambaram ............ H04W 4/40 |
| 2017/0059701 | A1* | 3/2017 | Oh ......................... G01S 13/74 |

OTHER PUBLICATIONS

Tse et al., Timestamp Inaccuracy Due to Idle Insert/Delete for AMs, Jan. 2020 (Year: 2020).*

* cited by examiner

*Primary Examiner* — Tejis Daya
(74) *Attorney, Agent, or Firm* — Fish & Richardson P.C.

(57) ABSTRACT

Disclosed are methods, systems, and computer-readable medium to perform operations comprising periodically broadcasting, by a first wireless device, outgoing ranging packets on a measurement channel of a wireless network; receiving, by the first wireless device on the measurement channel and from a second wireless device, a plurality of incoming ranging data packets; and calculating, by the first wireless device and using a three ranging packet exchange with the second wireless device, a range to the second wireless device.

15 Claims, 8 Drawing Sheets

MANY-TO-MANY WIRELESS NETWORK RANGING TECHNIQUE

CLAIM OF PRIORITY

This application claims priority to U.S. Provisional Patent Application No. 63/083,739 filed Sep. 25, 2020, entitled "MANY-TO-MANY WIRELESS NETWORK RANGING TECHNIQUE," the entirety of which is incorporated herein by reference.

TECHNICAL FIELD

This disclosure relates to wireless network ranging techniques.

BACKGROUND

A wireless device can use various positioning systems to determine its location. For example, the wireless device can use the Global Positioning System (GPS) or other satellite-based systems. The wireless device may also share its determined position with other devices. However, in various scenarios, such as when there is poor satellite connectivity, the wireless device may not be able to use positioning systems to determine its location.

SUMMARY

For various reasons, it is useful for wireless devices to determine ranges to other nearby wireless devices (called peer devices). For example, a wireless device can determine the locations of the nearby wireless devices based on the ranges to those devices. One way for wireless devices to determine the range to one another is to exchange packets and determine the range based on the time-of-flight (ToF) of the exchanged packets. Existing ToF ranging techniques are one-to-one ranging techniques, where one device exchanges two packets with another device to determine the ToF to that device. Such ranging techniques may be successful when there are two devices involved. However, if more than two devices are involved, then these ranging techniques are subject to collisions that may cause the techniques to fail. For example, if two devices try to simultaneously determine a range to a third device, only one of the two devices may succeed. Given the potential number of wireless devices that may be in proximity, existing ranging techniques may not be sufficient. Existing ranging techniques also suffer from other deficiencies, such as requiring a central coordinator and consuming a significant amount of resources (e.g., battery power, computing power, and time).

This disclosure describes techniques for performing ToF-based ranging between many wireless devices (e.g., on the order of 3, 5, 10, or more devices) that are in proximity (e.g., in a range in which the devices can exchange packets). In a full mesh technique, a device determines respective ranges to multiple other wireless devices. In some embodiments, each device accesses a measurement channel of a wireless network (e.g., a Wi-Fi network) for a measurement period. During the measurement period, a participating device periodically broadcasts one or more ranging packets and listens for ranging packets that are broadcast by the other devices. A wireless device then uses three ranging packet exchanges with other devices to calculate the ranges to the other devices. For example, a first device uses a three ranging packet exchange with a second device to calculate a range to the second device, and vice versa. The ranging calculation is based on transmit/receive times of the three ranging packets exchanged between the devices. In order for each device to have the necessary values to perform the ranging calculations, each device includes, in the ranging packets that it broadcasts, information about the ranging packets that the device has previously received and/or transmitted.

In accordance with aspects of the present disclosure, a method for ranging by a first wireless device is disclosed. The method involves periodically broadcasting outgoing ranging packets on a measurement channel of a wireless network at respective broadcast intervals; receiving, on the measurement channel and from a second wireless device, a plurality of incoming ranging data packets at respective receive times; and calculating, using a three ranging packet exchange with the second wireless device, a range to the second wireless device.

The previously-described implementation can be performed using a computer-implemented method; a non-transitory, computer-readable medium storing computer-readable instructions to perform the computer-implemented method; a processor including circuitry to execute one or more instructions that, when executed, cause the processor to perform the computer-implemented method; and a computer system including a computer memory interoperably coupled with a hardware processor configured to perform the computer-implemented method or the instructions stored on the non-transitory, computer-readable medium. These and other embodiments may each optionally include one or more of the following features.

In some implementations, the first and second wireless devices are configured to access the measurement channel for a measurement period in response to a trigger.

In some implementations, the three ranging packet exchange comprises three subsequent ranging packets including: (i) first and second outgoing ranging packets broadcast by the first wireless device, and (ii) an incoming ranging packet broadcast by the second wireless device and received by the first wireless device.

In some implementations, calculating the range based on a transmit time (t1) of the first outgoing ranging packet, a receipt time (t2) of the first outgoing ranging packet at the second wireless device, a transmit time (t3) of the incoming ranging packet by the second wireless device, a receipt time (t4) of the incoming ranging packet at the first wireless device, a transmit time (t5) of the second outgoing ranging packet, and a receipt time (t6) of the second outgoing ranging packet at the second wireless device.

In some implementations, calculating the range to the second wireless device based on t1, t2, t3, t4, t5, and t6 comprises: calculating a roundtrip time (RTT) to the second wireless devices using: RTT: $(t4-T1)(1+PPM)-(t3-t2)$, and RTT: $-(t5-T4)(1+PPM)+(t6-t3)$; and calculating, based the RTT, the range to the second wireless device, wherein PPM is a clock offset between the first wireless device and the second wireless device.

In some implementations, the method further involves: calculating, using the three ranging packet exchange with the second wireless device, a clock offset with the second wireless device.

In some implementations, a first outgoing ranging packet of the outgoing ranging packets comprises: (i) an egress report that includes information indicative of one or more previously broadcast outgoing ranging packets sent by the first wireless device, (ii) a peer ingress report that includes information indicative of one or more previously received incoming ranging packets from at least the second wireless device, and (iii) one or more local receive times associated with the one or more previously received incoming ranging packets.

In some implementations, a first incoming ranging packet of the plurality of incoming ranging packets comprises: (i) an egress report that includes information indicative of one or more previously broadcast outgoing ranging packets sent by the second wireless device, (ii) a peer ingress report that includes information indicative of one or more previously received incoming ranging packets from at least the first wireless device, and (iii) one or more local receive times associated with the one or more previously received incoming ranging packets.

In some implementations, the method further involves: storing in a local database associated with the second wireless device: (i) local receive times of the plurality of incoming ranging data packets, (ii) the egress reports associated with the plurality of incoming ranging data packets, and (iii) the receive times at the second wireless device of the outgoing ranging packets broadcast by the first wireless device.

In accordance with other aspects of the present disclosure, another method to be performed by a first wireless device determining a range to a second wireless device is disclosed. The method involves broadcasting, on a measurement channel of a wireless network, a first ranging packet at a first time (t1), wherein the first ranging packet is received by the second wireless device at a second time (t2); receiving a second ranging packet from the second wireless device, the second ranging packet transmitted by the second wireless device at a third time (t3) and received by the first wireless device at a fourth time (t4) broadcasting a third ranging packet at a fifth time (t5), wherein the third ranging packet is received by the second wireless device at a sixth time (t6); and calculating a range to the second wireless device based on t1, t2, t3, t4, t5, and t6.

The previously-described implementation can be performed using a computer-implemented method; a non-transitory, computer-readable medium storing computer-readable instructions to perform the computer-implemented method; a processor including circuitry to execute one or more instructions that, when executed, cause the processor to perform the computer-implemented method; and a computer system including a computer memory interoperably coupled with a hardware processor configured to perform the computer-implemented method or the instructions stored on the non-transitory, computer-readable medium. These and other embodiments may each optionally include one or more of the following features.

In some implementations, calculating a range to the second wireless device based on t1, t2, t3, t4, t5, and t6 involves calculating a roundtrip time (RTT) to the second wireless device using: RTT: (t4−T1)(1+PPM)−(t3−t2), and RTT: −(t5−T4)(1+PPM)+(t6−t3); and calculating, based the RTT, the range to the second wireless device, wherein PPM is a clock offset between the first wireless device and the second wireless device.

In some implementations, the method further involves calculating a clock offset between the first wireless device and the second wireless device.

In some implementations, the method further involves receiving, a fourth ranging packet from the second wireless device, wherein the fourth ranging packet includes information indicative of t2, t3, and t6.

The subject matter described in this specification can be implemented to realize one or more of the following advantages. The disclosed ranging techniques can achieve ranging between many wireless devices (e.g., on the order of 3, 5, 10+ or 20+ devices), which cannot be achieved using existing ranging techniques. Additionally, by virtue of being a full mesh technique, the disclosed techniques do not have a single point of failure. Thus, even if a single device fails, the ranging calculations between the other devices are unaffected. The disclosed techniques also are resilient to hidden nodes. And compared to existing ranging techniques, the disclosed techniques have a shorter measurement duration, perform better in congested conditions, have better reliability and resiliency, use less power, and have greater ranging accuracy. Additionally, unlike existing techniques, the disclosed ranging techniques account for and calculate clock offsets between devices, which further improves the ranging accuracy.

The details of one or more implementations of the subject matter described in this disclosure are set forth in the accompanying drawings and the description. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This disclosure describes techniques for performing time-of-flight (ToF)-based ranging between multiple wireless devices (e.g., including 10 or more devices) that are in proximity. In these full mesh techniques, each device can determine respective ranges to other nearby wireless devices. In some embodiments, each device accesses a wireless measurement channel for a measurement period. During the measurement period, a device periodically broadcasts ranging packets and listens for ranging packets that are broadcast by other devices. The wireless devices then use three ranging packet exchanges with other devices to calculate the ranges to one another. For example, a first device uses a three ranging packet exchange with a second device to calculate a range to that device. The second device also can use a three ranging packet exchange with the first device to calculate a range to the first device. In particular, the ranging calculation is based on transmit/receive times of the three ranging packets that are exchanged between the devices. In order for each device to have the necessary information (e.g., transmit/receive times) for the ranging calculations, each device includes, in the ranging packets that it broadcasts, information about the ranging packets that the device has previously received and/or transmitted.

Figure 1:
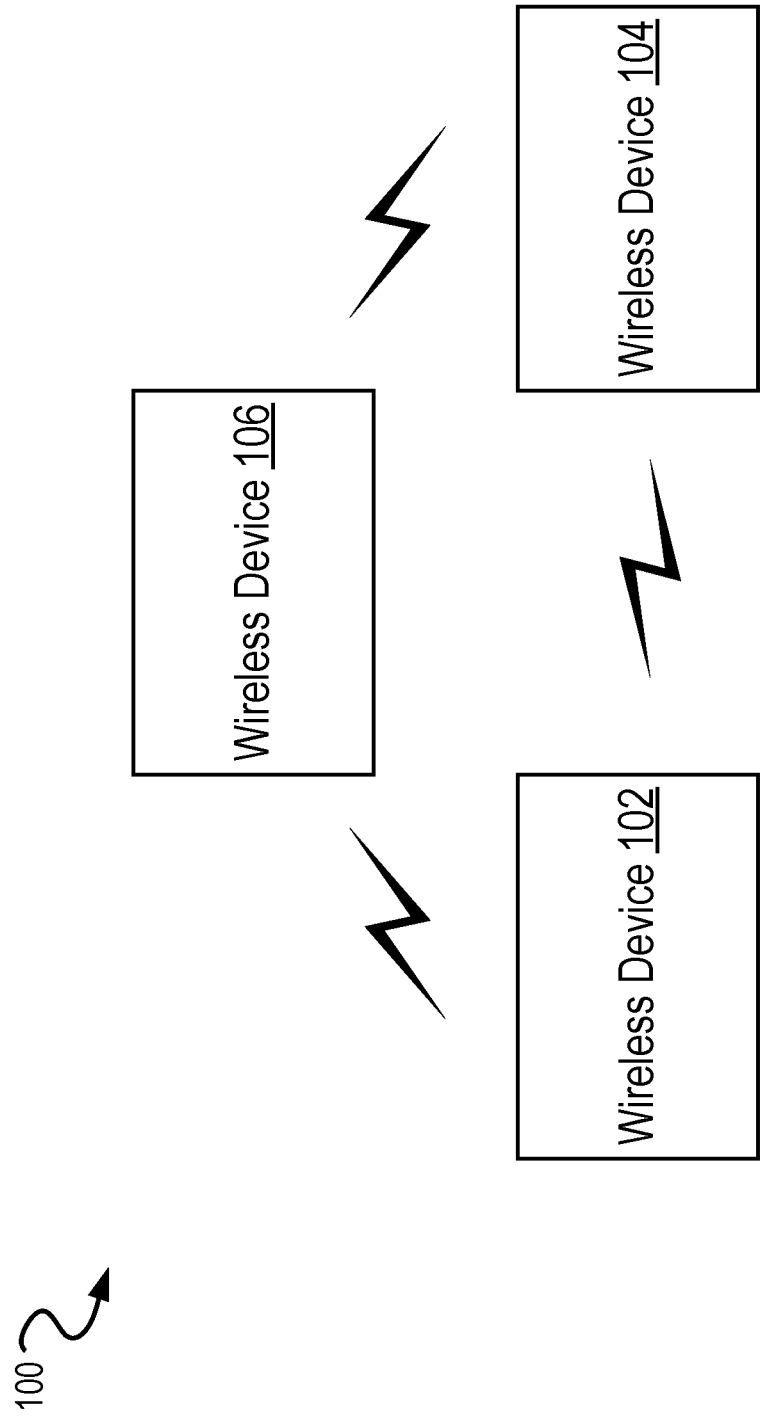
FIG. 1 illustrates an example wireless communication system, according to some implementations of the present disclosure.

FIG. 1 illustrates a wireless communication system 100, according to some implementations. As shown in FIG. 1, the wireless communication system 100 includes a ("first") wireless device 102, a ("second") wireless device 104, and a ("third") wireless device 106 that may wirelessly communicate with one another. As described herein, the wireless devices 102-106 may use the disclosed ranging techniques to determine ranges to one another. Note that the wireless communication system 100 is shown for illustration purposes only, as the wireless communication system 100 may include more or fewer wireless devices without departing from the scope of the disclosure.

In some embodiments, the wireless devices 102-106 may communicate using any of a number of wireless communication techniques. The wireless devices 102-106 can communicate using wireless local area networking (WLAN) communication technology (e.g., IEEE 802.11/Wi-Fi based communication) and/or techniques based on WLAN wireless communication. Additionally, the wireless devices 102-106 may communicate via one or more other wireless communication protocols, such as Bluetooth (BT), Bluetooth Low Energy (BLE), near field communication (NFC), GSM, UMTS (WCDMA, TDSCDMA), LTE, LTE-Advanced (LTE-A), 5G NR, 3GPP2 CDMA2000 (e.g., 1×RTT, 1×EV-DO, HRPD, eHRPD), among other wireless communication protocols.

Figure 6:
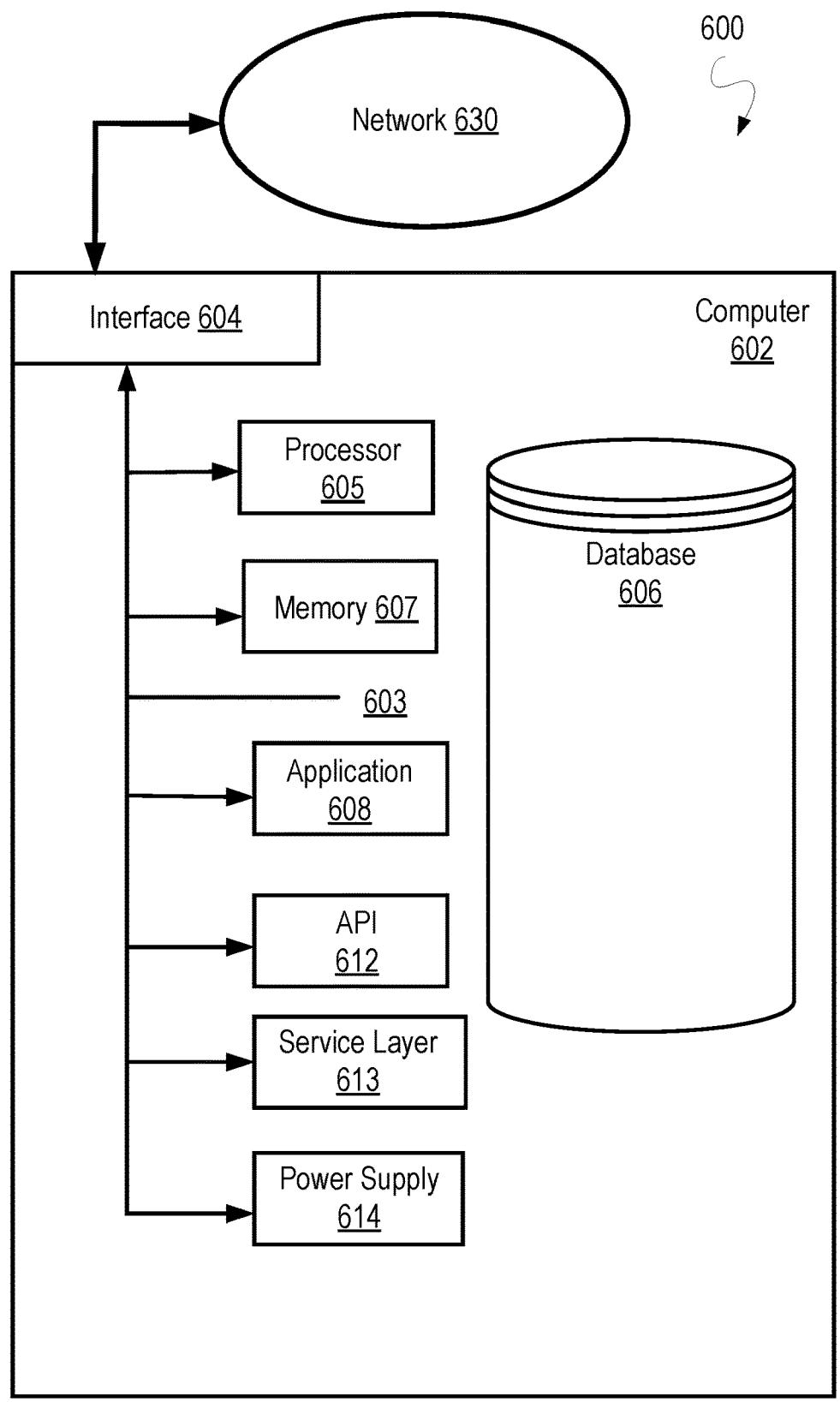
FIG. 6 illustrates an example computer system for implementing some of the disclosed embodiments or portion(s) thereof, according to some implementations of the present disclosure.

The wireless devices 102-106 may each be implemented by a computing system, such as the computing system 600 of FIG. 6. More specifically, the wireless devices 102-106 may be any of a number of wireless device types. As an example, one or more of the wireless devices 102-106 may be a substantially portable wireless user equipment (UE) device, such as a smart phone, a hand-held device, a wearable device (e.g., a smart watch), a tablet, a motor vehicle, or any other type of wireless device. As another example, one or more of the wireless devices 102-106 may be a substantially stationary device, such as a set top box, media player (e.g., an audio or audiovisual device), gaming console, desktop computer, appliance, door, access point, base station, among other examples of stationary devices.

In some embodiments, wireless devices, e.g., the wireless devices 102-106, may engage in a "many-to-many" ranging technique. In full mesh techniques, each wireless device determines or estimates a range (e.g., distance) to other wireless devices (also called peer devices). By enabling each wireless device to estimate the range to other wireless devices, the many-to-many ranging techniques allow each wireless device to accurately determine the locations of other wireless devices in the mesh. Note that in many-to-many ranging techniques, the wireless devices do not have to be connected to the same wireless network, let alone be connected to any wireless infrastructure network at all. Thus, the techniques can be implemented by any wireless devices in proximity, irrespective of whether the devices are on the same network.

In some embodiments, to implement a many-to-many ranging technique, the wireless devices access a channel of a wireless network that is designated as a measurement channel. Within examples, one of one or more triggers can cause the wireless devices to access the measurement channel in order to implement the ranging techniques. One example trigger is an amount of time elapsed since the wireless devices last accessed the measurement channel, such that the wireless devices periodically access the measurement channel. The periodicity at which the wireless devices access the measurement channel can be any period of time, e.g., on the order of less than a second, one or more seconds, one or more minutes, or tens of minutes. In an example, the wireless devices access the measurement channel every two minutes. The measurement channel can be any available channel in a wireless network. For example, in a Wi-Fi network, the channel can be Channel 6 (CH 6). However, any channel can be selected.

In some embodiments, the wireless devices access the measurement channel for a measurement period. The measurement period can by any period of time. By way of example, the measurement period can be on the order of milliseconds (ms), tens of ms, or hundreds of ms. In an example, the measurement period is 350 ms. During the measurement period, each wireless device periodically broadcasts ranging packets that can be received by other wireless devices. Additionally, each wireless device listens for and receives ranging packets from other wireless devices. The broadcasting period at which the wireless devices broadcast the ranging packets can be any period of time, By way of example, the broadcasting period can be on the order of ms, tens of ms, or hundreds of ms. In an example, the broadcasting period is 70 ms.

Figure 2:
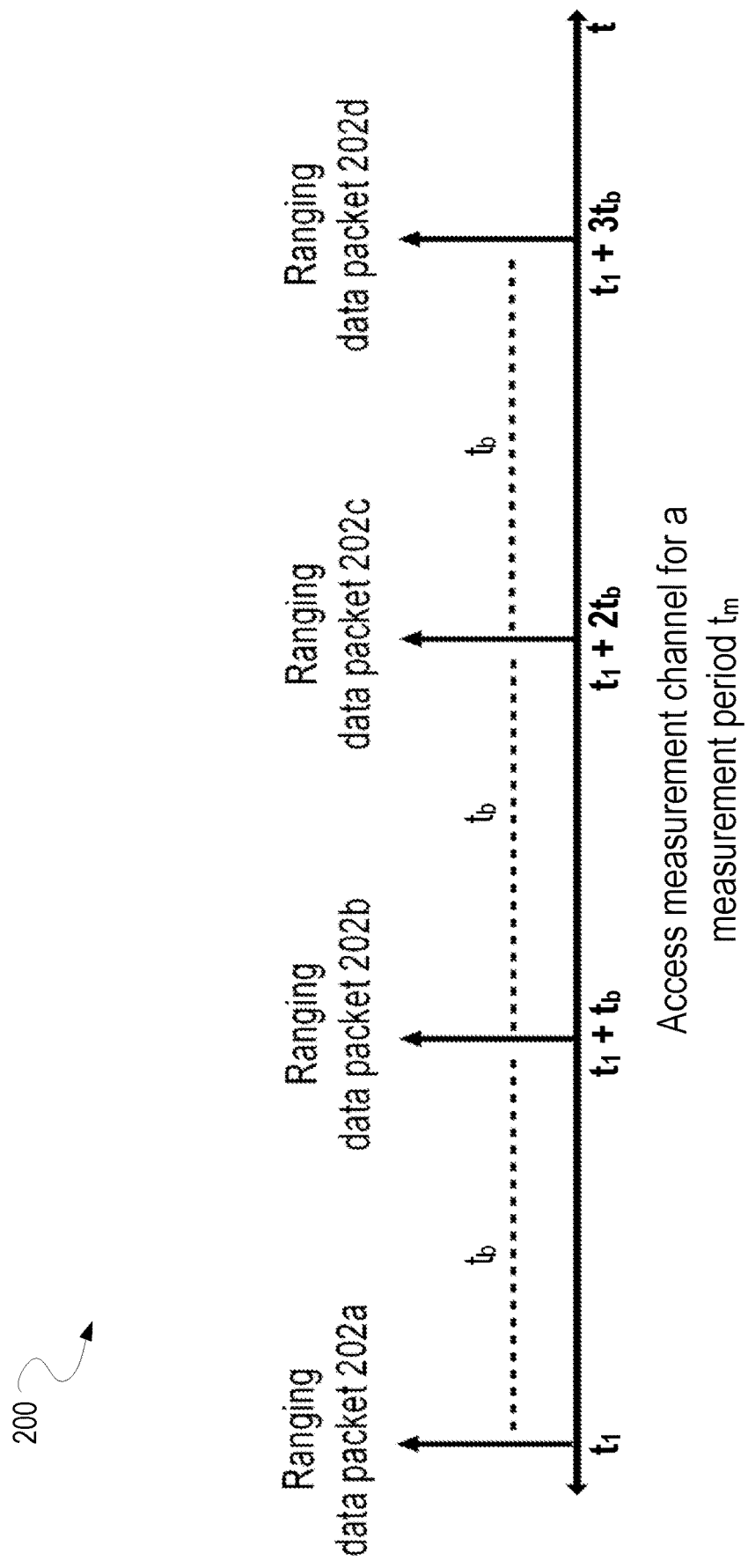
FIG. 2 illustrates example ranging packets broadcast by a wireless device, according to some implementations of the present disclosure.

FIG. 2 illustrates an example 200 of ranging packets broadcast by a wireless device, according to some implementations. The wireless device (not illustrated in FIG. 2) is configured to access a measurement channel (e.g., in response to one or more triggers) for a measurement period, $t_m$. During the measurement period, the wireless device periodically broadcasts a ranging packet, e.g., every broadcasting period, $t_b$. As shown in FIG. 2, the wireless device broadcasts a first ranging packet 202a at time $t_1$, a second ranging packet 202b at time $t_1+t_b$, a third ranging packet 202c at time $t_1+2t_b$, and a fourth ranging packet 202d at time $t_1+3t_b$. Note that the number of ranging packets that are broadcast during the measurement period is based on the lengths of the measurement and broadcasting periods. In addition to broadcasting ranging packets, the wireless device also can receive ranging packets broadcast by one or more of the wireless device's peer devices during the measurement period.

In some embodiments, a wireless device uses a three ranging packet exchange with a peer device in order to calculate the range to that peer device. The three ranging packet exchange is any three ranging packets that are exchanged between the wireless device and the peer device. As an example, a three ranging packet exchange can include two ranging packets broadcast by the wireless device and received by the peer device, and one ranging packet broadcast by the peer device and received by the wireless device (e.g., any 2×TX+1×RX packets). As another example, a three ranging packet exchange can include one ranging packet broadcast by the wireless device and received by the peer device, and two ranging packets broadcast by the peer device and received by the wireless device (i.e., any 2×RX+1×T1 packets).

In some embodiments, the wireless device can use transmit and receive times of the three ranging packets exchanged with the peer device in order to calculate a round trip time (RTT) to the peer device. In the example where a wireless device transmits two packets and receives one packet, the RTT calculation is based on six variables: a transmit time ($t_1$) of a first ranging packet broadcast by the wireless device, a receipt time (t2) of the first ranging packet at the peer device, a transmit time (t3) of a second ranging packet by the peer device, a receipt time (t4) of the second ranging packet at the wireless device, a transmit time (t5) of a third ranging packet broadcast by the wireless device, and a receipt time (t6) of the third ranging packet at the peer device. From the calculated RTT, the wireless device calculates the ToF to the peer device. Using a three ranging packet exchange, e.g., as opposed to the two ranging packet exchange used in some existing techniques, allows the wireless device to calculate and compensate for a clock offset with the peer device. The clock offset can be expressed in any appropriate unit, such as parts per million (PPM).

In some embodiments, the RTT from the wireless device to the peer device is calculated using Equations (1) and (2).

$$RTT:(t4-t1)(1+PPM)-(t3-t2) \quad \text{Equation (1)}$$

$$RTT: -(t5-t4)(1+PPM)+(t6-t3) \quad \text{Equation (2)}$$

Then, the wireless device uses Equation (3) to calculate the time of flight to the peer device.

$$ToF: \frac{RTT}{2} \quad \text{Equation (3)}$$

As shown in Equations (1) and (2), the round trip calculation accounts for the clock offset between the devices. The wireless device can also calculate the clock offset using Equations (1) and (2). Within examples, the wireless device can calculate the clock offset each time that the device calculates the RTT to the peer device, or can calculate the clock offset at periodic intervals (e.g., once every measurement period).

Figure 4:
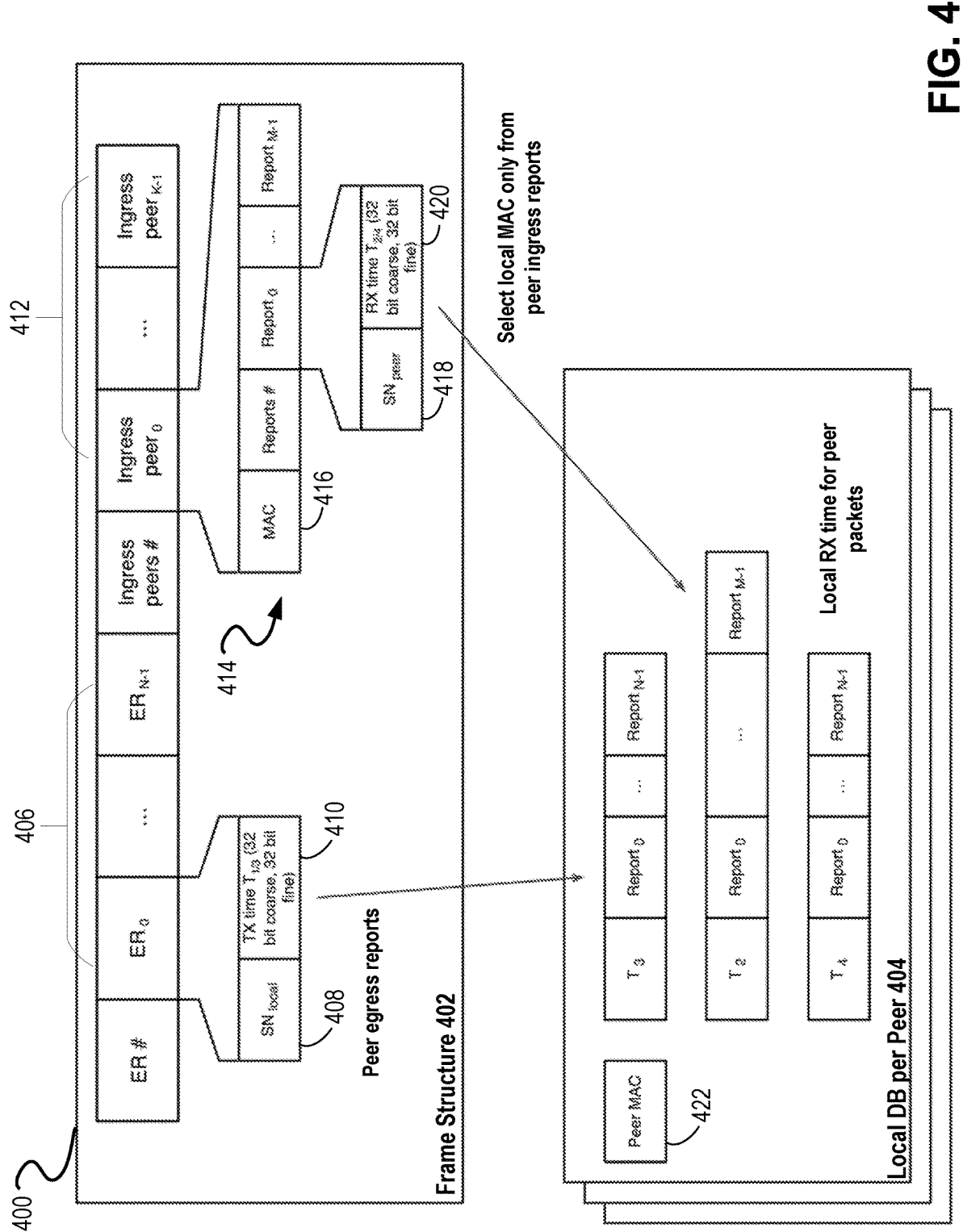
FIG. 4 illustrates an example ranging packet frame structure and an example local database of a wireless device, according to some implementations of present disclosure.

As stated above, the wireless device uses the transmit and receive times of the three ranging packets exchanged with the peer device in order to calculate the round trip time. However, the wireless device does not know the transmit/receive times at the peer device (e.g., t2, t3, and t6). In some embodiments, in order to facilitate for the wireless device to obtain the values necessary to perform the ranging calculation, each (or a subset) ranging packet includes reports indicative of the ranging packets that were sent and/or received prior to sending that ranging packet. In some scenarios, the reports may be included starting from the fourth ranging packet that is exchanged between the wireless device and the peer device. In an example, the reports of a ranging packet broadcast by the wireless device include: (i) identifiers of the reported ranging packets (e.g., sequence numbers), (ii) identifiers of the peer devices (e.g., a media access control address (MAC address)) that broadcasted the ranging packets received by the wireless device, (iii) receipt times of the received ranging packets, and (iv) transmit times of the ranging packets broadcast by the wireless device. FIG. 4 (described below) illustrates an example frame structure of a ranging packet.

In some embodiments, when a wireless device receives a ranging packet, the wireless device stores, e.g., in a local database, the reports included in the ranging packet. The stored information can be grouped by peer device and identified by a peer device identifier (e.g., a MAC address). For each peer device, the wireless device stores: (i) local receive times of the ranging packets broadcast by the peer device, (ii) the peer transmit times of the ranging packets broadcast by the peer device, and (iii) the receive times at the peer device of the ranging packets broadcast by the wireless device. FIG. 4 (described below) also illustrates a local database of a wireless device.

Figure 3A:
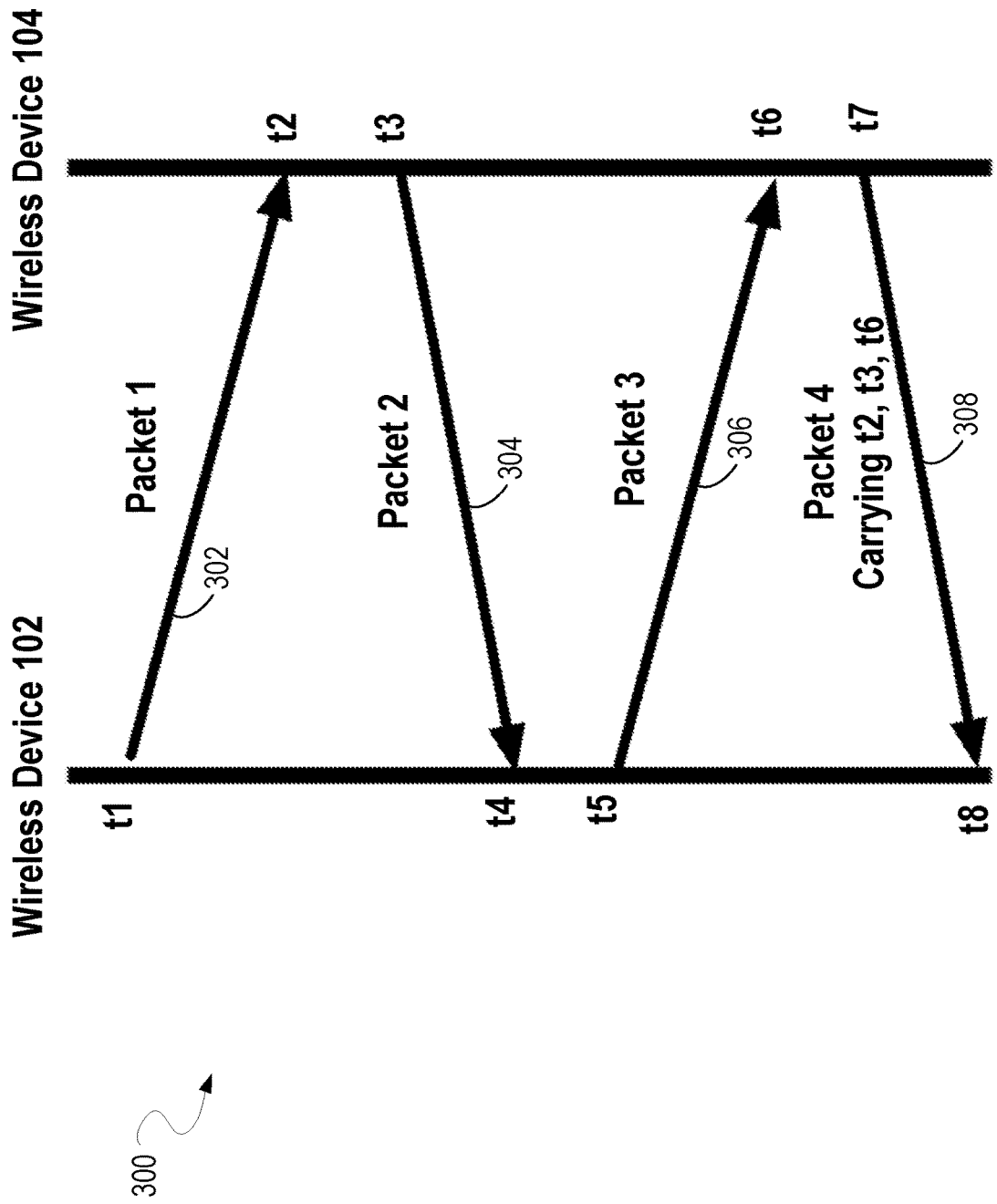
FIG. 3A and FIG. 3B each illustrate an example communication flow diagram between two wireless devices performing the disclosed ranging techniques, according to some implementations of the present disclosure.
Figure 3B:
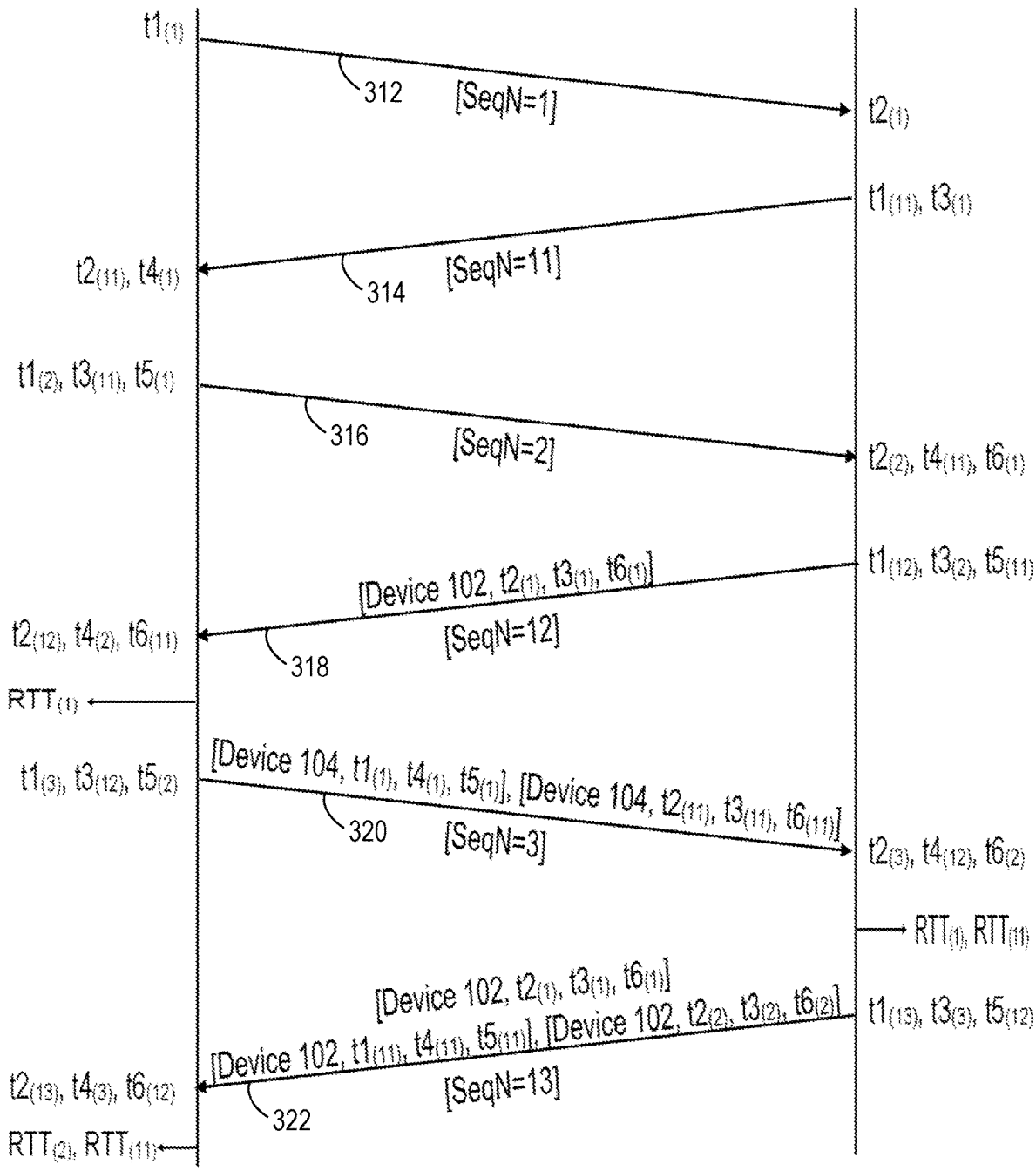

FIG. 3A and FIG. 3B each illustrate a communication flow diagram between two wireless devices performing a disclosed ranging technique, according to some implementations. These figures illustrate how a first wireless device, e.g., the wireless device 102, implements many-to-many ranging in order to calculate a range to at least a second wireless device, e.g., the wireless device 104. Although the illustrated examples depict communication between two wireless devices, similar communication flows can occur between any device and any/all of the other devices participating in the ranging arrangement.

Turning to FIG. 3A, the wireless devices 102, 104 are configured to access a measurement channel for a measurement period. At time t1 during the measurement period, the wireless device 102 broadcasts ranging packet 1 (also labelled as packet 302), which is received by the wireless device 104 at time t2. At time t3, the wireless device 104 broadcasts ranging packet 2 (also labelled as packet 304), which is received by the wireless device 102 at time t4. At time t5, the wireless device 102 broadcasts ranging packet 3 (also labelled as packet 306), which is received by the wireless device 104 at time t6.

Now that three ranging packets have been exchanged between the two devices, the wireless device 104 generates ranging packet 4 (also labelled as packet 308) that includes reports indicative of: (i) the receipt time, t2, of the ranging packet 1, (ii) the transmit time, t3, of the ranging packet 2, (iii) and the receipt time, t6, of the ranging packet 3. Each time is identified by a respective identifier (e.g., sequence number) of the ranging packet with which the time is associated. For example, t2 is identified by a sequence number of the ranging packet 1, t3 is identified by a sequence number of the ranging packet 2, and t6 is identified by a sequence number of the ranging packet 3. Additionally, the times t2 and t6 are associated with an identifier of the wireless device 102, which indicates that these two times are associated with ranging packets received from the wireless device 102. The wireless device 104 then broadcasts the ranging packet 4 at time t7, which is then received by the wireless device 102 at time t8.

The wireless device 102 stores the information included in the ranging packet 4 in a local database. In particular, the wireless device 102 associates the stored information with an identifier of the wireless device 104 (e.g., a MAC address) of the wireless device 104). The wireless device 102 can use the stored information and its knowledge of times t1, t4, and t5 to calculate the RTT to the wireless device 104, e.g., using Equations (1) and (2). From the calculated RTT, the wireless device 102 can calculate the ToF to the wireless device 104, which, in turn, is used to calculate or estimate the range to the wireless device 104. Additionally, the wireless device 102 can calculate a clock offset from the wireless device 104.

FIG. 3B illustrates a detailed communication flow diagram 310 between the wireless devices 102, 104. In the communication flow diagram 310, each ranging packet is identified by a respective sequence number. Additionally, the subscript of each time is indicative of the iteration number of a three ranging packet exchange with which the time is associated. For example, a subscript of 1 indicates that the time is associated with a first three ranging packet exchange between the wireless device 102, 104. Note that because any three ranging packets can constitute a three ranging packet exchange, a time may be associated with more than one three ranging packet exchange.

The communication flow diagram 310 starts at time $t1_{(1)}$ at which the wireless device 102 broadcasts a ranging packet 312 (also identified by sequence number 1). The subscript of $t1_{(1)}$ indicates that the time is associated with a first three ranging packet exchange. The ranging packet 312 is received by the wireless device 104 at time $t2_{(1)}$. The wireless device 104 broadcasts a ranging packet 314 (also identified by sequence number 11) at time $t3_{(1)}$ or $t1_{(11)}$. The subscript 1 of $t3_{(1)}$ indicates that the time is a third time of the first three ranging packet exchange and the subscript 11 of $t1_{(11)}$ indicates that the time is also a first time of a second three ranging packet exchange. The wireless device 102 receives the ranging packet 314 at time $t4_{(1)}$, $t2_{(11)}$. The wireless devices 102, 104 then exchange ranging packet 316 (also identified by sequence number 2), which is broadcast at time $t1_{(2)}$, $t3_{(11)}$, $t5_{(1)}$ and received at time $t2_{(2)}$, $t4_{(11)}$, $t6_{(1)}$. Now that the first three ranging packet exchange is complete, the wireless device 104 includes $t2_{(1)}$, $t3_{(1)}$, $t6_{(1)}$ in the next ranging packet that is broadcasts. As shown in FIG. 3B, the ranging packet 318 (also identified by sequence number 12) includes $t2_{(1)}$, $t3_{(1)}$, $t6_{(1)}$. Additionally, the ranging packet 318 includes an identifier of the wireless device 102, which is used to identify $t2_{(1)}$ and $t6_{(1)}$ as being associated with ranging packets broadcast by the wireless device 102.

The wireless device 102 uses the information received in the ranging packet 318 and $t1_{(1)}$, $t4_{(1)}$, $t5_{(1)}$ to calculate $RTT_{(1)}$. The subscript 1 of $RTT_{(1)}$ indicates that the RTT is calculated using the first three ranging packet exchange. Additionally, the wireless device 102 calculates a clock offset from the wireless device 104. At time $t1_{(3)}$, $t3_{(12)}$, $t5_{(2)}$, the wireless device 102 broadcasts a ranging packet 320 (also identified by sequence number 3), which is received by the wireless device 104 at time $t2_{(3)}$, $t4_{(12)}$, $t6_{(2)}$. As shown in FIG. 3B, the ranging packet 320 includes times associated with the first three ranging packet exchange (i.e., $t1_{(1)}$, $t4_{(1)}$, $t5_{(1)}$ and times associated with the second three ranging packet exchange (i.e., $t2_{(11)}$, $t3_{(11)}$, $t6_{(11)}$. Thus, the wireless device 104 can use the information received in the ranging packet 320 and $t2_{(1)}$, $t3_{(1)}$, $t6_{(1)}$ to calculate $RTT_{(1)}$ (i.e., the RTT based on the first three ranging packet exchange). Additionally, the wireless device 104 can use the information received in the ranging packet 320 and $t2_{(11)}$, $t3_{(11)}$, $t6_{(11)}$ to calculate $RTT_{(11)}$ (i.e., the RTT based on the second three ranging packet exchange). Further, the wireless device 104 uses the information received in the ranging packet 320 to calculate a clock offset from the wireless device 102.

At time $t1_{(13)}$, $t3_{(3)}$, $t5_{(12)}$, the wireless device 104 broadcasts a ranging packet 322 (also identified by sequence number 13), which is received by the wireless device 102 at time $t2_{(13)}$, $t4_{(3)}$, $t6_{(12)}$. As shown in FIG. 3B, the ranging packet 322 includes times associated with the first three ranging packet exchange (i.e., $t2_{(1)}$, $t3_{(1)}$, $t6_{(1)}$, times associated with the second three ranging packet exchange (i.e., $t1_{(11)}$, $t4_{(11)}$, $t5_{(10)}$, and times associated with a third three ranging packet exchange (i.e., $t2_{(2)}$, $t3_{(2)}$, $t6_{(2)}$). Note that the wireless device 104 includes the times associated with the first three ranging packet exchange even though this information was previously sent in ranging packet 318. Resending the information improves the reliability of the technique since the wireless device 102 can calculate $RTT_{(1)}$ even if packet 318 was not received by the device. The historical information is re-sent by each subsequent ranging packet until a data capacity of the ranging packet is reached. Then, the oldest historical information is dropped from the next ranging packet.

The exchange of ranging packets between the wireless devices 102, 104 continues until the measurement period has ended. Once the measurement period has ended, both devices stop listening on the measurement channel until the next measurement period. Note that the devices may calculate more than one round trip time during a single measurement period. For example, in addition to calculating $RTT_{(1)}$, the wireless device 102 may also calculate $RTT_{(11)}$ and $RTT_{(2)}$ based on the information included in the ranging packet 322. Calculating more than one RTT in a single measurement period improves the reliability and robustness of the ranging calculation. In some examples, statistical analysis is used to analyze the calculated RTTs in order to improve the accuracy of the calculation. For example, an average of the calculated RTTs may be used to calculate the time-of-flight to a peer device. Additionally, the wireless devices can calculate the clock offset each time that the device calculates the RTT to the peer device, or can calculate the clock offset at periodic intervals (e.g., once every measurement period).

Also note that during each measurement period, there is a multitude of measurements performed by each device to each of the other devices (that is, each three way packet combination). Thus, even with high packet drops, there is still sufficient measurements between each pair.

FIG. 4 illustrates a frame structure 402 of a ranging packet 400 and a local database 404 of a wireless device, according to some implementations. In FIG. 4, it is assumed that the ranging packet 400 is being received by a wireless device that includes the local database 404. For the purposes of this example, also assume that the ranging packet 400 is broadcast by the wireless device 104 and received by the wireless device 102. For example, the ranging packet 400 may be ranging packet 320 of FIG. 3B.

As shown in FIG. 4, the frame structure 402 includes egress reports 406. Each egress report 406 includes information indicative of a ranging packet that was previously broadcast by the wireless device 104 (i.e., the device that broadcast the ranging packet 400). The egress reports 406 may be arranged in chronological order, where $ER_0$ stores information associated with an oldest ranging packet broadcast by the wireless device and $ER_{N-1}$ stores information associated with the most recently broadcast ranging packet. Each egress report 406 includes an identifier field 408 and a transmit time field 410. Specifically, the identifier field 408 stores a sequence number of the ranging packet reported in that egress report 406. And the transmit time field 410 includes a transmit time of the reported ranging packet. In an example, the transmit time is reported as a 32 bit coarse and a 32 bit fine number.

Additionally, the frame structure 402 includes ingress peer fields 412. Each ingress peer field 412 is associated with a respective peer device of the wireless device 104. Further, each ingress peer field 412 includes a peer device identifier field 416 and ingress report fields. The ingress report fields include information indicative of the ranging packets that were previously received by the wireless device 104 from the respective ingress peer. To illustrate, assume that the ingress $peer_0$ field 414 is associated with the wireless device 102. The ingress $peer_0$ field 414 includes a peer device identifier field 416 and ingress report fields. The peer device identifier field 416 includes an identifier of the wireless device 102, such as a MAC address. The ingress report fields include information indicative of the ranging packets that were previously received by the wireless device 104 from the wireless device 102. Each ingress report field includes a ranging packet identifier field 418 and a receive time field 420. The ranging packet identifier field 418 includes a sequence number of the ranging packet that is reported in that ingress report and the receive time field 420 includes a receive time of the reported ranging packet. In an example, the receive time is reported as a 32 bit coarse and a 32 bit fine number.

Upon receipt of the ranging packet 400, the wireless device 102 stores in a database the information included in the ranging packet. In an example, the wireless device 102 groups the stored information per peer. As such, the wireless device 102 includes a local database 404 per peer device. As shown in FIG. 4, the information associated with a peer device is grouped together and identified by a peer MAC 422. In an example, the information associated with a peer device includes: (i) peer egress reports that include information indicative of the ranging packets that were previously broadcast by the peer device, (ii) peer ingress reports that include information indicative of the ranging packets that were previously received by the peer device from the wireless device 102, and (iii) local receive times for ranging packets received from the peer device. As shown in FIG. 4, the peer egress reports 406 of the wireless device 104 are stored as $T_3$, the peer ingress reports of the wireless device 104 are stored as $T_2$, and the local receive times of ranging packets received from the wireless device 104 are stored as $T_4$.

Figure 5A:
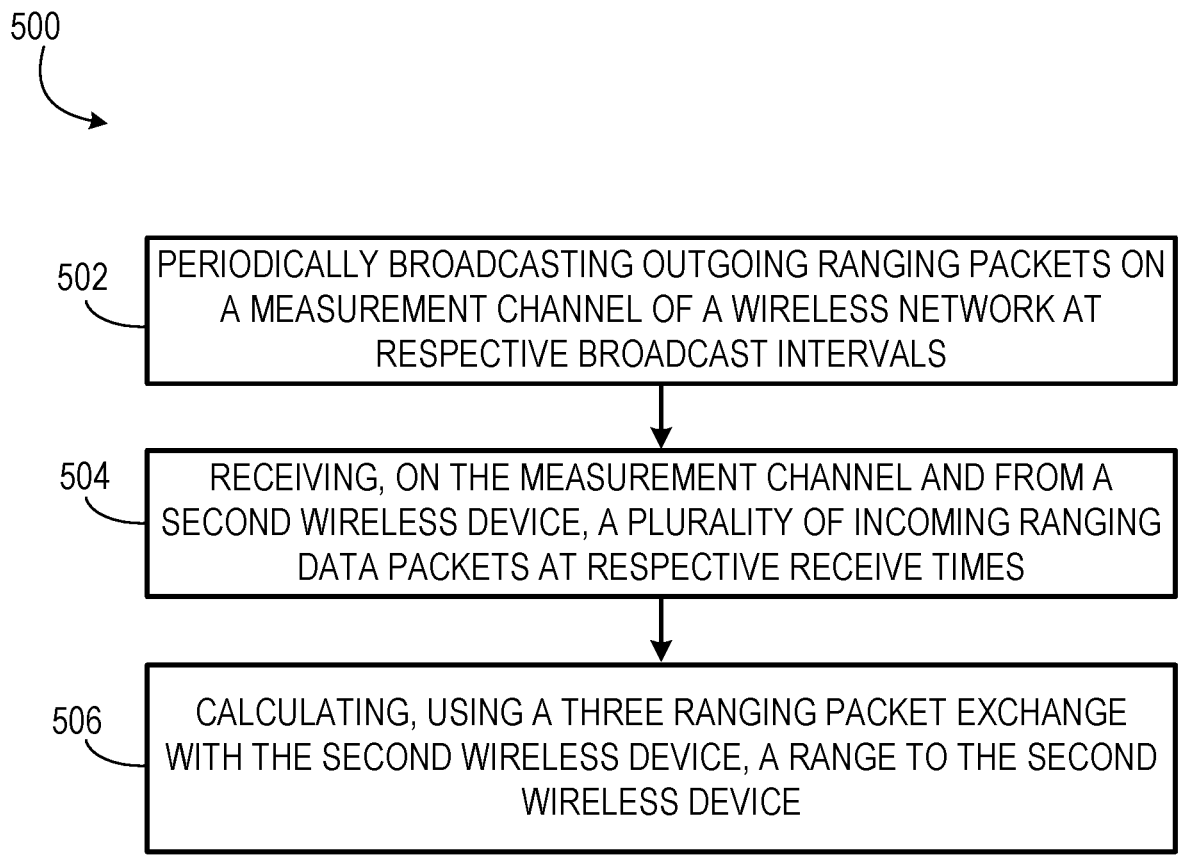
FIG. 5A and FIG. 5B each illustrate a flowchart of an example method, according to some implementations of the present disclosure.

FIG. 5A illustrates a flowchart of an example method 500, according to some implementations of the present disclosure. The method 500 can be performed by each of many wireless devices in proximity, such that each device determines the location of each of the other devices. For example, the method 500 can be performed by a first wireless device that is determining a range to a second wireless device. For clarity of presentation, the description that follows generally describes method 500 in the context of the other figures in this description. However, it will be understood that method 500 can be performed, for example, by any suitable system, environment, software, hardware, or a combination of systems, environments, software, and hardware, as appropriate. In some implementations, various steps of method 500 can be run in parallel, in combination, in loops, or in any order.

At step 502, method 500 involves periodically broadcasting outgoing ranging packets on a measurement channel of a wireless network at respective broadcast intervals. The outgoing ranging packets are broadcast the first wireless device that is determining the range to the second wireless device.

At step 504, method 500 involves receiving, on the measurement channel and from a second wireless device, a plurality of incoming ranging data packets at respective receive times.

At step 506, method 500 involves calculating, using a three ranging packet exchange with the second wireless device, a range to the second wireless device.

In some implementations, the first and second wireless devices are configured to access the measurement channel for a measurement period in response to a trigger.

In some implementations, the three ranging packet exchange comprises three subsequent ranging packets including: (i) first and second outgoing ranging packets broadcast by the first wireless device, and (ii) an incoming ranging packet broadcast by the second wireless device and received by the first wireless device.

In some implementations, calculating the range based on a transmit time (t1) of the first outgoing ranging packet, a receipt time (t2) of the first outgoing ranging packet at the second wireless device, a transmit time (t3) of the incoming ranging packet by the second wireless device, a receipt time (t4) of the incoming ranging packet at the first wireless device, a transmit time (t5) of the second outgoing ranging packet, and a receipt time (t6) of the second outgoing ranging packet at the second wireless device.

In some implementations, calculating the range to the second wireless device based on t1, t2, t3, t4, t5, and t6 comprises: calculating a roundtrip time (RTT) to the second wireless devices using: RTT: (t4−T1)(1+PPM)−(t3−t2), and RTT: −(t5−T4)(1+PPM)+(t6−t3); and calculating, based the RTT, the range to the second wireless device, wherein PPM is a clock offset between the first wireless device and the second wireless device.

In some implementations, the method further involves: calculating, using the three ranging packet exchange with the second wireless device, a clock offset with the second wireless device.

In some implementations, a first outgoing ranging packet of the outgoing ranging packets comprises: (i) an egress report that includes information indicative of one or more previously broadcast outgoing ranging packets sent by the first wireless device, (ii) a peer ingress report that includes information indicative of one or more previously received incoming ranging packets from at least the second wireless device, and (iii) one or more local receive times associated with the one or more previously received incoming ranging packets.

In some implementations, a first incoming ranging packet of the plurality of incoming ranging packets comprises: (i) an egress report that includes information indicative of one or more previously broadcast outgoing ranging packets sent by the second wireless device, (ii) a peer ingress report that includes information indicative of one or more previously received incoming ranging packets from at least the first wireless device, and (iii) one or more local receive times associated with the one or more previously received incoming ranging packets.

In some implementations, the method further involves: storing in a local database associated with the second wireless device: (i) local receive times of the plurality of incoming ranging data packets, (ii) the egress reports associated with the plurality of incoming ranging data packets, and (iii) the receive times at the second wireless device of the outgoing ranging packets broadcast by the first wireless device.

Figure 5B:
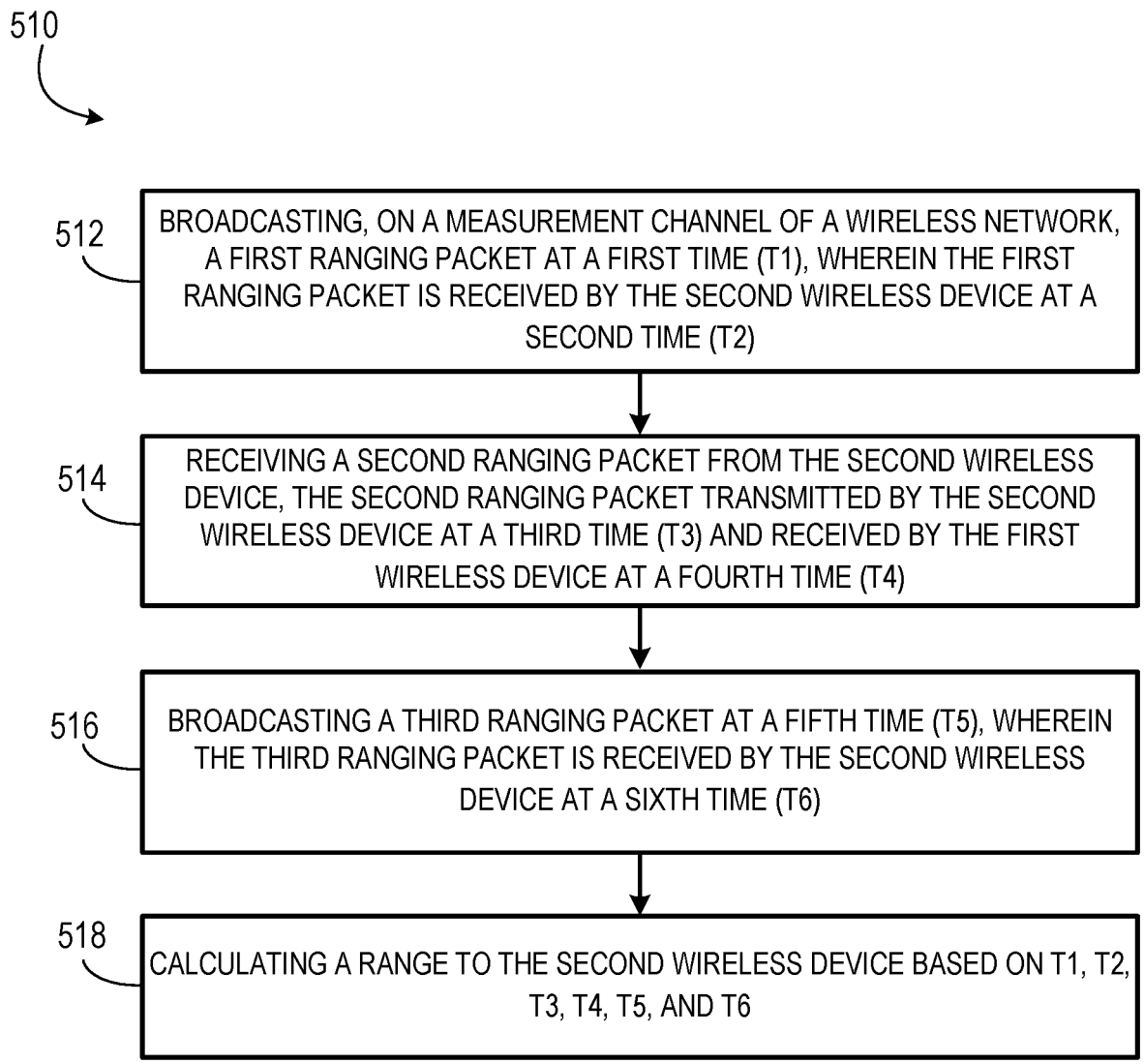

FIG. 5B illustrates a flowchart of an example method 510, according to some implementations of the present disclosure. The method 510 can be performed by each of many wireless devices in proximity, such that each device determines the location of each of the other devices. For example, the method 510 can be performed by a first wireless device that is determining a range to a second wireless device. For clarity of presentation, the description that follows generally describes method 510 in the context of the other figures in this description. However, it will be understood that method 510 can be performed, for example, by any suitable system, environment, software, hardware, or a combination of systems, environments, software, and hardware, as appropriate. In some implementations, various steps of method 500 can be run in parallel, in combination, in loops, or in any order.

At step 512, method 510 involves broadcasting, on a measurement channel of a wireless network, a first ranging packet at a first time (t1), wherein the first ranging packet is received by the second wireless device at a second time (t2).

At step 514, method 510 involves receiving a second ranging packet from the second wireless device, the second ranging packet transmitted by the second wireless device at a third time (t3) and received by the first wireless device at a fourth time (t4).

At step 516, method 510 involves broadcasting a third ranging packet at a fifth time (t5), wherein the third ranging packet is received by the second wireless device at a sixth time (t6).

At step 518, method 510 involves calculating a range to the second wireless device based on t1, t2, t3, t4, t5, and t6.

In some implementations, calculating a range to the second wireless device based on t1, t2, t3, t4, t5, and t6 involves calculating a roundtrip time (RTT) to the second wireless device using: RTT: (t4−T1)(1+PPM)−(t3−t2), and RTT: −(t5−T4)(1+PPM)+(t6−t3); and calculating, based the RTT, the range to the second wireless device, wherein PPM is a clock offset between the first wireless device and the second wireless device.

In some implementations, method 510 further involves calculating a clock offset between the first wireless device and the second wireless device.

In some implementations, method 510 further involves receiving, a fourth ranging packet from the second wireless device, wherein the fourth ranging packet includes information indicative of t2, t3, and t6.

FIG. 6 is a block diagram of an example computer system 600 that can be used to provide computational functionalities associated with described algorithms, methods, functions, processes, flows, and procedures described in the present disclosure, according to some implemendtations of the present disclosure. In some implementations, the wireless device 102-106 can be the computer system 600, include the computer system 600, or include part of the computer system 600.

The illustrated computer 602 is intended to encompass any computing device such as a server, a desktop computer, embedded computer, a laptop/notebook computer, a wireless data port, a smart phone, a personal data assistant (PDA), a tablet computing device, or one or more processors within these devices, including physical instances, virtual instances, or both. The computer 602 can include input devices such as keypads, keyboards, and touch screens that can accept user information. Also, the computer 602 can include output devices that can convey information associated with the operation of the computer 602. The information can include digital data, visual data, audio information, or a combination of information. The information can be presented in a graphical user interface (UI) (or GUI). In some implementations, the inputs and outputs include display ports (such as DVI-I+2× display ports), USB 3.0, GbE ports, isolated DI/O, SATA-III (6.0 Gb/s) ports, mPCIe slots, a combination of these, or other ports. In instances of an edge gateway, the computer 602 can include a Smart Embedded Management Agent (SEMA), such as a built-in ADLINK SEMA 2.2, and a video sync technology, such as Quick Sync Video technology supported by ADLINK MSDK+. In some examples, the computer 602 can include the MXE-5400 Series processor-based fanless embedded computer by ADLINK, though the computer 602 can take other forms or include other components.

The computer 602 can serve in a role as a client, a network component, a server, a database, a persistency, or components of a computer system for performing the subject matter described in the present disclosure. The illustrated computer 602 is communicably coupled with a network 630. In some implementations, one or more components of the computer 602 can be configured to operate within different environments, including cloud-computing-based environments, local environments, global environments, and combinations of environments.

At a high level, the computer 602 is an electronic computing device operable to receive, transmit, process, store, and manage data and information associated with the described subject matter. According to some implementations, the computer 602 can also include, or be communicably coupled with, an application server, an email server, a web server, a caching server, a streaming data server, or a combination of servers.

The computer 602 can receive requests over network 630 from a client application (for example, executing on another computer 602). The computer 602 can respond to the received requests by processing the received requests using software applications. Requests can also be sent to the computer 602 from internal users (for example, from a command console), external (or third) parties, automated applications, entities, individuals, systems, and computers.

Each of the components of the computer 602 can communicate using a system bus. In some implementations, any or all of the components of the computer 602, including hardware or software components, can interface with each other or the interface 604 (or a combination of both), over the system bus. Interfaces can use an application programming interface (API), a service layer, or a combination of the API and service layer. The API can include specifications for routines, data structures, and object classes. The API can be either computer-language independent or dependent. The API can refer to a complete interface, a single function, or a set of APIs.

The service layer can provide software services to the computer 602 and other components (whether illustrated or not) that are communicably coupled to the computer 602. The functionality of the computer 602 can be accessible for all service consumers using this service layer. Software services, such as those provided by the service layer, can provide reusable, defined functionalities through a defined interface. For example, the interface can be software written in JAVA, C++, or a language providing data in extensible markup language (XML) format. While illustrated as an integrated component of the computer 602, in alternative implementations, the API or the service layer can be stand-alone components in relation to other components of the computer 602 and other components communicably coupled to the computer 602. Moreover, any or all parts of the API or the service layer can be implemented as child or sub-modules of another software module, enterprise application, or hardware module without departing from the scope of the present disclosure.

The computer 602 can include an interface 604. Although illustrated as a single interface 604 in FIG. 6, two or more interfaces 604 can be used according to particular needs, desires, or particular implementations of the computer 602 and the described functionality. The interface 604 can be used by the computer 602 for communicating with other systems that are connected to the network 630 (whether illustrated or not) in a distributed environment. Generally, the interface 604 can include, or be implemented using, logic encoded in software or hardware (or a combination of software and hardware) operable to communicate with the network 630. More specifically, the interface 604 can include software supporting one or more communication protocols associated with communications. As such, the network 630 or the interface's hardware can be operable to communicate physical signals within and outside of the illustrated computer 602.

The interface 604 may also include one or more antennas for communicating using one or more wireless communication protocols. In some cases, one or more parts of a receive and/or transmit chain may be shared between multiple wireless communication standards. For example, a device might be configured to communicate using either Bluetooth or Wi-Fi using partially or entirely shared wireless communication circuitry (e.g., using a shared radio or at least shared radio components). The shared communication circuitry may include a single antenna, or may include multiple antennas (e.g., for MIMO) for performing wireless communications.

Alternatively, the interface 604 may include separate transmit and/or receive chains (e.g., including separate antennas and other radio components) for each wireless communication protocol with which it is configured to communicate. As a further possibility, the computer 602 may include one or more radios or radio components which are shared between multiple wireless communication protocols, and one or more radios or radio components which are used exclusively by a single wireless communication protocol. For example, the computer 602 may include a shared radio for communicating using one or more of LTE, CDMA2000 1×RTT, GSM, and/or 5G NR, and separate radios for communicating using each of Wi-Fi and Bluetooth. Other configurations are also possible.

The computer 602 includes a processor 605. Although illustrated as a single processor 605 in FIG. 6, two or more processors 605 can be used according to particular needs, desires, or particular implementations of the computer 602 and the described functionality. Generally, the processor 605 can execute instructions and can manipulate data to perform the operations of the computer 602, including operations using algorithms, methods, functions, processes, flows, and procedures as described in the present disclosure.

The computer 602 can also include a database 606 that can hold data for the computer 602 and other components connected to the network 630 (whether illustrated or not). For example, database 606 can be an in-memory, conventional, or a database storing data consistent with the present disclosure. In some implementations, database 606 can be a combination of two or more different database types (for example, hybrid in-memory and conventional databases) according to particular needs, desires, or particular implementations of the computer 602 and the described functionality. Although illustrated as a single database 606 in FIG. 6, two or more databases (of the same, different, or combination of types) can be used according to particular needs, desires, or particular implementations of the computer 602 and the described functionality. While database 606 is illustrated as an internal component of the computer 602, in alternative implementations, database 606 can be external to the computer 602.

The computer 602 also includes a memory 607 that can hold data for the computer 602 or a combination of components connected to the network 630 (whether illustrated or not). Memory 607 can store any data consistent with the present disclosure. In some implementations, memory 607 can be a combination of two or more different types of memory (for example, a combination of semiconductor and magnetic storage) according to particular needs, desires, or particular implementations of the computer 602 and the described functionality. Although illustrated as a single memory 607 in FIG. 6, two or more memories 607 (of the same, different, or combination of types) can be used according to particular needs, desires, or particular implementations of the computer 602 and the described functionality. While memory 607 is illustrated as an internal component of the computer 602, in alternative implementations, memory 607 can be external to the computer 602.

An application can be an algorithmic software engine providing functionality according to particular needs, desires, or particular implementations of the computer 602 and the described functionality. For example, an application can serve as one or more components, modules, or applications. Multiple applications can be implemented on the computer 602. Each application can be internal or external to the computer 602.

The computer 602 can also include a power supply 614. The power supply 614 can include a rechargeable or non-rechargeable battery that can be configured to be either user- or non-user-replaceable. In some implementations, the power supply 614 can include power-conversion and management circuits, including recharging, standby, and power management functionalities. In some implementations, the power-supply 614 can include a power plug to allow the computer 602 to be plugged into a wall socket or a power source to, for example, power the computer 602 or recharge a rechargeable battery.

There can be any number of computers 602 associated with, or external to, a computer system including computer 602, with each computer 602 communicating over network 630. Further, the terms "client," "user," and other appropriate terminology can be used interchangeably, as appropriate, without departing from the scope of the present disclosure. Moreover, the present disclosure contemplates that many users can use one computer 602 and one user can use multiple computers 602.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification includes many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A first wireless device comprising:
   one or more processors; and
   a non-transitory computer-readable storage medium communicatively coupled to the one or more processors and storing programming instructions for execution by the one or more processors, the programming instructions instructing the one or more processors to perform operations comprising:
     periodically broadcasting outgoing ranging packets on a measurement channel of a wireless network at respective broadcast intervals;
     receiving, on the measurement channel and from a second wireless device, a plurality of incoming ranging data packets at respective receive times; and
     calculating, using a three ranging packet exchange with the second wireless device, a range to the second wireless device,
       wherein at least one outgoing ranging packet of the plurality comprises: (i) an egress report that includes information indicative of one or more previously broadcast outgoing ranging packets sent by the first wireless device, (ii) a peer ingress report that includes information indicative of one or more previously received incoming ranging packets from at least the second wireless device, and (iii) one or more local receive times associated with the one or more previously received incoming ranging packets.

2. The first wireless device of claim 1, wherein the first and second wireless devices are configured to access the measurement channel for a measurement period in response to a trigger.

3. The first wireless device of claim 1, wherein the three ranging packet exchange comprises three subsequent ranging packets including: (i) first and second outgoing ranging packets broadcast by the first wireless device, and (ii) an incoming ranging packet broadcast by the second wireless device and received by the first wireless device.

4. The first wireless device of claim 3, wherein calculating the range to the second wireless device comprises:

calculating the range based on a transmit time (t1) of the first outgoing ranging packet, a receipt time (t2) of the first outgoing ranging packet at the second wireless device, a transmit time (t3) of the incoming ranging packet by the second wireless device, a receipt time (t4) of the incoming ranging packet at the first wireless device, a transmit time (t5) of the second outgoing ranging packet, and a receipt time (t6) of the second outgoing ranging packet at the second wireless device.

5. The first wireless device of claim 4, wherein calculating the range to the second wireless device based on t1, t2, t3, t4, t5, and t6 comprises:
calculating a roundtrip time (RTT) to the second wireless devices using:

$$RTT:(t4-t1)(1+PPM)-(t3-t2), \text{ and}$$

$$RTT: -(t5-t4)(1+PPM)+(t6-t3); \text{ and}$$

calculating, based the RTT, the range to the second wireless device, wherein PPM is a clock offset between the first wireless device and the second wireless device.

6. The first wireless device of claim 1, wherein the operations further comprise:
calculating, using the three ranging packet exchange with the second wireless device, a clock offset with the second wireless device.

7. The first wireless device of claim 1, wherein one incoming ranging packet of the plurality of incoming ranging packets comprises: (i) an egress report that includes information indicative of one or more previously broadcast outgoing ranging packets sent by the second wireless device, (ii) a peer ingress report that includes information indicative of one or more previously received incoming ranging packets from at least the first wireless device, and (iii) one or more local receive times associated with the one or more previously received incoming ranging packets.

8. The first wireless device of claim 7, the operations further comprising:
storing in a local database associated with the second wireless device: (i) local receive times of the plurality of incoming ranging data packets, (ii) the egress reports associated with the plurality of incoming ranging data packets, and (iii) the receive times at the second wireless device of the outgoing ranging packets broadcast by the first wireless device.

9. A method to be performed by a first wireless device determining a range to a second wireless device, the method comprising:
periodically broadcasting outgoing ranging packets on a measurement channel of a wireless network at respective broadcast intervals;
receiving, on the measurement channel and from the second wireless device, a plurality of incoming ranging data packets at respective receive times; and
calculating, using a three ranging packet exchange with the second wireless device, a range to the second wireless device,
wherein at least one incoming ranging packet of the plurality of incoming ranging packets comprises: (i) an egress report that includes information indicative of one or more previously broadcast outgoing ranging packets sent by the second wireless device, (ii) a peer ingress report that includes information indicative of one or more previously received incoming ranging packets from at least the first wireless device, and (iii) one or more local receive times associated with the one or more previously received incoming ranging packets.

10. The method of claim 9, wherein calculating the range to the second wireless device comprises:
calculating the range based on a transmit time (t1) of a first outgoing ranging packet, a receipt time (t2) of the first outgoing ranging packet at the second wireless device, a transmit time (t3) of a first incoming ranging packet by the second wireless device, a receipt time (t4) of the first incoming ranging packet at the first wireless device, a transmit time (t5) of a second outgoing ranging packet, and a receipt time (t6) of the second outgoing ranging packet at the second wireless device.

11. The method of claim 10, wherein calculating the range to the second wireless device based on t1, t2, t3, t4, t5, and t6 comprises:
calculating a roundtrip time (RTT) to the second wireless devices using:

$$RTT:(t4-T1)(1+PPM)-(t3-t2), \text{ and}$$

$$RTT: -(t5-T4)(1+PPM)+(t6-t3); \text{ and}$$

calculating, based the RTT, the range to the second wireless device, wherein PPM is a clock offset between the first wireless device and the second wireless device.

12. The method of claim 9, further comprising calculating a clock offset between the first wireless device and the second wireless device.

13. The method of claim 9, wherein the method further comprises:
calculating, using the three ranging packet exchange with the second wireless device, a clock offset with the second wireless device.

14. The method of claim 9, wherein at least one outgoing ranging packet of the outgoing ranging packets comprises: (i) an egress report that includes information indicative of one or more previously broadcast outgoing ranging packets sent by the first wireless device, (ii) a peer ingress report that includes information indicative of one or more previously received incoming ranging packets from at least the second wireless device, and (iii) one or more local receive times associated with the one or more previously received incoming ranging packets.

15. A processor for a first wireless device, the processor comprising:
circuitry to execute one or more instructions that, when executed, cause the processor to perform operations comprising:
configuring a transmit chain to periodically broadcast outgoing ranging packets on a measurement channel of a wireless network at respective broadcast intervals;
receiving, from the measurement channel and from a second wireless device, a plurality of incoming ranging data packets at respective receive times; and
calculating a roundtrip time (RTT) to the second wireless device using:

$$RTT:(t4-t1)(1+PPM)-(t3-t2), \text{ and}$$

$$RTT: -(t5-t4)(1+PPM)+(t6-t3); \text{ and}$$

calculating, based the RTT, a range to the second wireless device, wherein:
PPM is a clock offset between the first wireless device and the second wireless device, t1 is a transmit time of a first outgoing ranging packet by the first wireless device, t2 is a receipt time of the first outgoing ranging packet at the second wireless device, t3 is a transmit time of a first incoming ranging packet by the second wireless device, t4 is a receipt time of the first incoming ranging packet at the first wireless device, t5 is a transmit time of a second outgoing ranging packet by the first wireless device, and t6 is a receipt time of the second outgoing ranging packet at the second wireless device.

* * * * *